United States Patent
Keidar et al.

(10) Patent No.: US 11,465,784 B2
(45) Date of Patent: Oct. 11, 2022

(54) MODULAR MICRO-CATHODE ARC THRUSTER

(71) Applicant: The George Washington University, Washington, DC (US)

(72) Inventors: Michael Keidar, Baltimore, MD (US); George Teel, Washington, DC (US); Samantha A. Hurley, Paramus, NJ (US); Denis Borisovich Zolotukhin, Arlington, VA (US)

(73) Assignee: The George Washington University, Washington, DC (US)

( * ) Notice: Subject to any disclaimer, the term of this patent is extended or adjusted under 35 U.S.C. 154(b) by 220 days.

(21) Appl. No.: 16/500,323

(22) PCT Filed: Apr. 2, 2018

(86) PCT No.: PCT/US2018/025670
§ 371 (c)(1),
(2) Date: Oct. 2, 2019

(87) PCT Pub. No.: WO2018/187204
PCT Pub. Date: Oct. 11, 2018

(65) Prior Publication Data
US 2021/0009286 A1 Jan. 14, 2021

Related U.S. Application Data

(60) Provisional application No. 62/480,952, filed on Apr. 3, 2017.

(51) Int. Cl.
*B64G 1/40* (2006.01)
*F03H 1/00* (2006.01)

(52) U.S. Cl.
CPC .......... *B64G 1/406* (2013.01); *F03H 1/0012* (2013.01); *B64G 1/405* (2013.01); *F03H 1/0081* (2013.01)

(58) Field of Classification Search
CPC .......... B64G 1/405; B64G 1/406; B64G 1/64; B64G 1/645; F02K 9/76; F02K 9/763; F02K 9/766
See application file for complete search history.

(56) References Cited

U.S. PATENT DOCUMENTS

| | | |
|---|---|---|
| 5,238,209 A | 8/1993 | Hornyak |
| 6,116,543 A | 9/2000 | Koppel |

(Continued)

OTHER PUBLICATIONS

I. Levchenko, et al., "Recent Progress and Perspectives of Space Electric Propulsion Systems Based on Smart Nanomaterials", Nature Communications, www.nature.com/naturecommunications, 2018, 19 pgs.

(Continued)

*Primary Examiner* — Arun Goyal
*Assistant Examiner* — William L Breazeal
(74) *Attorney, Agent, or Firm* — Blank Rome LLP

(57) ABSTRACT

A modular micro-cathode arc thruster for use in satellites. An exemplary satellite has a plurality of stacked modular arc thrusters, each having an external anode, an internal cathode, and an insulator therebetween. The arc thrusters are situated in a housing, wherein the housing has an opening to eject exhausted thrusters. Once an arc thruster is expended, the push rod ejects that arc thruster and the next arc thruster takes its place.

21 Claims, 14 Drawing Sheets

(56) References Cited

U.S. PATENT DOCUMENTS

2007/0153960 A1  7/2007  D'Ausilio et al.
2010/0193640 A1  8/2010  Atmur et al.
2011/0258981 A1* 10/2011 Keidar .................. F03H 1/0087
                                                    60/202
2016/0273524 A1  9/2016  Keidar et al.
2018/0162561 A1* 6/2018  Estevez .................. B64G 1/641

OTHER PUBLICATIONS

G. Teel, et al., "Discharge Ignition in the Micro-Cathode Arc Thruster", J. Appl. Phys, vol. 121, 023303, 2017, 8 pgs.
D. B. Zolotukhin, et al., "Optimization of Discharge Triggering in Micro-Cathode Vacuum Arc Thruster for CubeSats", Plasma Sources Science and Technology, https://doi.org/10.1088/1361-6595/aacdb0; vol. 27, 2018, 074001, 10 pgs.
International Search Report and Written Opinion for PCT/US2018/025670, dated Jun. 26, 2018, 9US-pages.

* cited by examiner

207

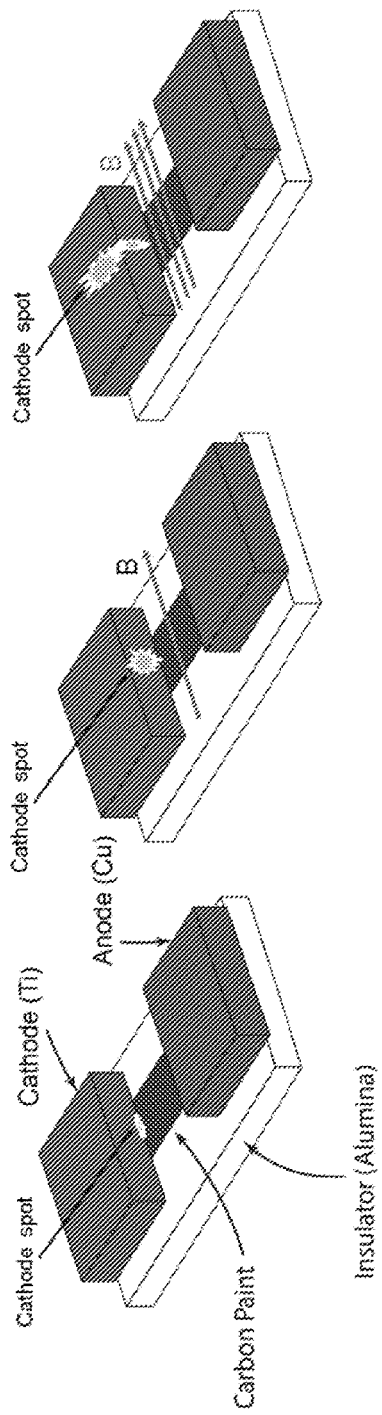
FIG. 11(a)
FIG. 11(b)
FIG. 11(c)
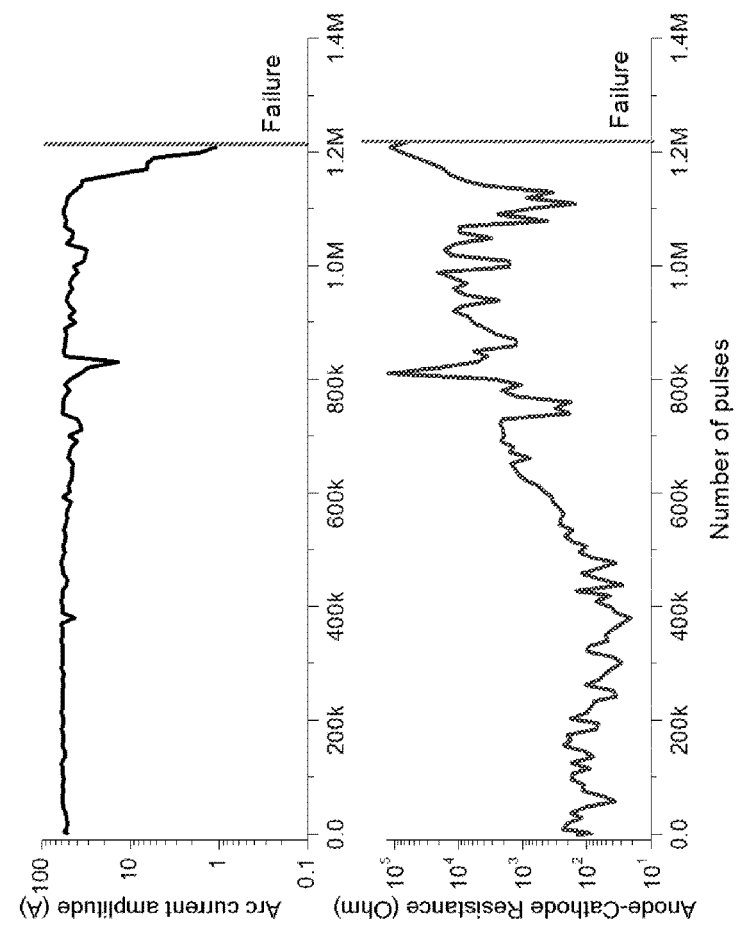
FIG. 12(a)
FIG. 12(b)

MODULAR MICRO-CATHODE ARC THRUSTER

RELATED APPLICATIONS

This application is a national phase of International Patent Application No. PCT/US2018/025670, filed Apr. 2, 2018, which claims the benefit of U.S. Provisional Application No. 62/480,952, filed Apr. 3, 2017. The entire contents of these applications are incorporated herein by reference.

BACKGROUND OF THE INVENTION

Field of the Invention

The present invention relates to a micro-cathode arc thruster. More particularly, the present invention relates to a modular micro-cathode arc thruster for preferable use in satellites.

Background of the Related Art

The number of space missions involving small satellites is growing each year. An increasing variety and complexity of small satellites applications requires simple design, cost- and energy-effective and durable propulsion systems. There are two main types of propulsion systems—electric and non-electric or chemical systems [1-3]. Non-electric systems (cold gas, liquid or solid propulsion systems, or hybrid [4] propulsion systems that utilize aluminum wool as fuel and a mixture of sodium hydroxide and water as an oxidizer) do not use electrical energy to produce thrust. Electric systems (vacuum arc thrusters, ion thrusters, low-power Hall effect thrusters (or so called 'Hall thrusters' [5]), etc.) use electricity to produce plasma which is creating the thrust by being accelerated to high velocity.

Vacuum arc thrusters (VATs) are gaining popularity as simple and reliable propulsion engines for small satellites such as CubeSats. Vacuum arc thrusters typically are working in a pulsed regime; however, there are successful attempts to design VAT capable to work in a continuous DC mode [6]. This type of thruster produces thrust as a result of expelling away from spacecraft the quasi-neutral plasma produced between two electrodes (anode and cathode) separated by dielectric with conductive film above it. One example of thrusters based on the vacuum arc is the so-called micro-cathode arc thruster (µCAT) that was developed by The George Washington University (GWU). These miniature pulsing thrusters produce a micro-Newton level impulse bits and thus are ideal for providing the propulsion, maneuvering, positioning and controllable de-orbiting of small, light-weight satellites like CubeSats. Micro-cathode vacuum thrusters from GWU are involved in several missions (BRICsat-P, launched on May 20, 2015, BRICsat-2, which is under development and CANYVAL-X launched on Jan. 12, 2018. Typically, a micro-cathode thruster is on the order of about 6 mm in diameter having a power level of about 0.1-10 Watt.

In the BRICsat-P mission, the set of four µCATs was integrated into the USNA's 1.5 U CubeSat to perform three maneuvers while at an orbit of 500 km: detumbling, spin, and a delta-V to change the orbit of the CubeSat relative to the orientation of Earth's magnetic field [7]. In CANYVAL-X mission, the two CubeSats (one is equipped by µCATs) should orbit together in tandem with a fixed line-of-sight distance between both satellites for a relatively long time in order to perform scientific measurements [8]. Such a precise positioning of a couple of CubeSats is feasible thanks to a fine pulsing thrust bits provided by µCATs placed on the one of them.

Typically in vacuum arc-based thrusters, a triggerless [9] arc ignition mechanism is utilized. Usually, electrodes are made of light metals and alloys (Al, Cu, Ti, brass, etc.); however, some thruster design solutions use another conductive but non-metallic cathode material like Carbon Fiber Reinforced Plastic (CFRP) [10].

However, thrusters with triggerless ignitions have a common problem of degradation of inter-electrode film after numerous arcing pulses, which leads to decrease their lifetime. Several attempts have been made in order to investigate this problem and find a way to increase the thruster lifetime. Kronhaus et al. [11] designed a vacuum arc thruster with linear feeding mechanism which provided around $10^6$ pulses of continuous firing. In this system, the continuously eroding central cathode was kept on a nearly fixed position with respect to anode plane by a linear feeding system with constant feeding speed.

Zhuang et al. [12] have designed a µCAT with tube-like configuration of anode and cathode separated by dielectric ring with conductive layer. Such thruster, while providing a relatively very long lifetime (up to $10^8$ pulses) [12], however, had a very significant drawback: a low thrust efficiency, since the majority of produced ions attached to the inner walls without producing the thrust as a consequence of tube-like geometry [13].

Both thruster configurations (i.e. with co-axial or tubular electrodes) involve the replenishing of cathode by feeding system, however, since one electrode is moving with respect to another, this may cause the sudden failure of the thruster because of losing the contact between the moving electrode and conductive inter-electrode film. Teel et al. [14] investigated the ignition mechanisms with a thruster model having two immovable metal bars, tightly pressed to a ceramic plate with a conductive layer between them. They have shown that alumina ceramic, which was used as a base for the conductive inter-electrode film, is the best insulating material in terms of providing the longest lifetime (up to 180 k arc pulses).

Carbon paint is one of the most popular materials used in the modern triggerless thrusters, because it can be easily deposited under atmospheric pressure by a simple brush on the electrodes of any geometrical configuration. Its evaporation as a result of preliminary current flowing between cathode and anode provides the initial particles into vacuum which cause the breakdown, and the formation of the cathode spot, expelling the cathodic jet. However, all parts (cathode, anode, inter-electrode film and insulator) degrade after each arc pulse. Note that the sources of metal propellant (the cathode or anode, later is in the case of thruster with ablative anode [15]), can be easily replenished by special feeding system like cathode linear drive replenishing system with stepper motor [16, 17]. So the electrode consumption is not affecting so much the thruster lifetime. The 'weak link' here is the degradation of inter-electrode film. The main idea of extending the thruster lifetime is to provide the conditions for replenishing the inter-electrode film by the metal particles from cathode jet, directed toward the surface of the film.

Triggerless vacuum arc discharge is well-known and convenient tool for deposition of various coatings [19], so one can expect that re-deposition of cathode particles on inter-electrode film can be successfully utilized in vacuum arc thrusters to prolong their life time. The study of physical factors (the value of anode-cathode gap, arcing pulse energy, the presence of magnetic field) which may effect on the process of the re-deposition of the film seems to be highly relevant. However, in the literature there are almost no works devoted to the research of vacuum arc thruster lifetime vs. experimental parameters. Due to the lack of detailed research of the main ignition peculiarities and lifetime characterization of μCAT thruster with plane stationary electrodes ("idealized" thruster model), there is a need in the art for the invention disclosed herein.

SUMMARY OF THE INVENTION

Accordingly, it is an object of the invention to disclose a satellite comprised of one or more arc thrusters, with an external anode, an internal cathode, and an insulator therebetween; a housing in which the one or more arc thrusters are situated, wherein the housing has an opening to eject exhaust; a push rod encircled by a sleeve; a first coupler and a second coupler; and a motor with a motor shaft extending from the motor. During operation, the push rod extends through the first and second coupler and attaches to the motor shaft, and the push rod acts to eject the one or more arc thrusters upon operation of the motor.

It is another object of the invention to disclose a satellite in which the one or more arc thrusters are cylindrical and stacked within the housing, so that they may be ejected once depleted.

It is yet another object of the invention to disclose a satellite in which a stepper motor and motor shaft are used to convert rotational energy to linear energy, which powers a push rod to eject arc thrusters.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 11(a) shows the location of a cathode spot in the absence of a magnetic field;

FIG. 11(b) shows the location of the cathode spot with optimal magnetic field;

FIG. 11(c) shows the location of the cathode spot with high magnetic field;

FIG. 12(a) shows the thruster arc current versus the number of arcing pulses; and FIG. 12(b) shows the anode-cathode resistance versus the number of arcing pulses.

DETAILED DESCRIPTION OF THE PREFERRED EMBODIMENTS

Figure 1B:
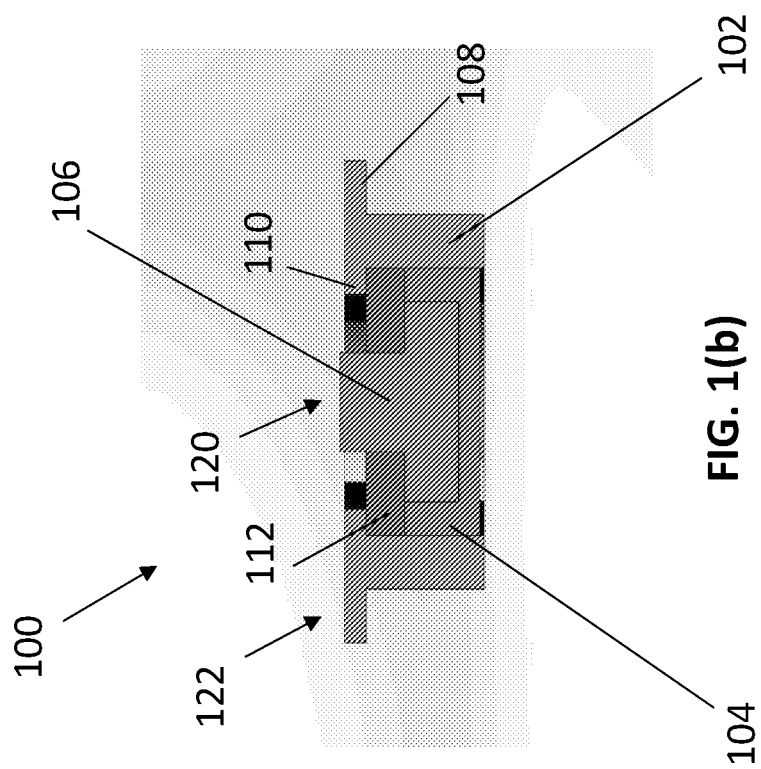
FIG. 1(b) shows a cross-sectional representation of a single modular micro-cathode arc thruster according to an embodiment of the invention.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

As discussed herein, a modular micro-cathode arc thruster is disclosed herein. With respect to the present invention, insights into the erosion, coating, and plasma plume exhaust are applied to arrive at a technology superior to that previously known in the art. With erosion studies, it is now clearer when a particular insulator will lose material. It can be determined when and how a cathode ablates and where the initial interactions happen in a thruster. In the course of the process, a coating forms from the cathode, which coats both the anode and the insulator. This plasma plume erupts outwards from whichever surface has ablation, and from this, it can be determined that a central cathode is the better configuration for the thruster. Moreover, by examining Langmuir probe studies, it can be determined that a central cathode provides a constant and consistent localized higher density plasma exhaust. This exhaust, due to geometry and physics of cathode spot erosion, always erodes near the center of the tip of the cathode. This all combines to provide a new design, in accordance with the present invention, as discussed herein, and is superior to prior art in that it maximizes the output and prolong the lifetime of the thruster.

In the present invention, similar to the flat plate designs, there is no feeding mechanism involved, and the thruster is exhausted once the propellant is consumed. The problem with this concept, as previously discussed, is that the erosion typically happens at a constant location. Even with an induced magnetic field, non-uniform localized zones of ablation tend to occur leading to early failure of the thruster. However, it is preferable that the thruster be cylindrical, where a magnetic field may be used to force uniform erosion. The present invention is more efficient than other, more complex designs that add a spring or feeding mechanism to the electrodes. The complication comes at a cost, resulting in more complexity and higher costs.

Figure 1A:
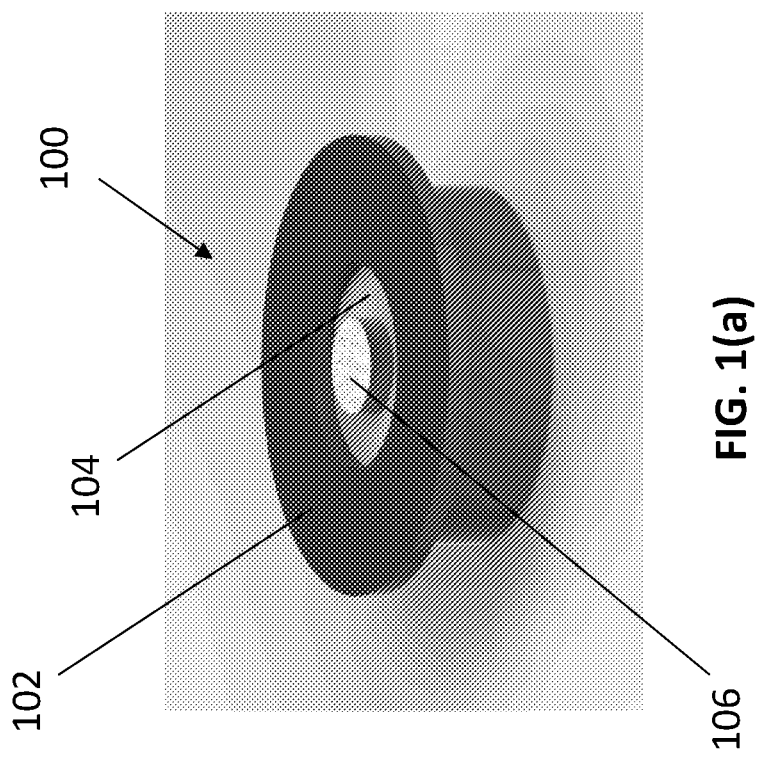
FIG. 1(a) shows a schematic representation of a single modular micro-cathode arc thruster according to an embodiment of the invention.

Referring now to FIGS. 1(a) and 1(b), an embodiment of the thruster 100 in accordance with a non-limiting illustrative embodiment of the present invention is shown and described. In general, the present invention is comprised of a series of "pucks" or mini-μCATs. An exemplary digital micro-cathode arc thruster (μCAT) 100 is shown in FIG. 1(a) in an isometric view and in FIG. 1(b) in a cross-sectional view. Small, compact, and reduced down to the essence of what a μCAT is, these digital μCATs are a proper answer to the major concerns the μCAT has. Each digital μCAT 100 has an inner electrode 120 and an outer electrode 122. In one embodiment, the inner electrode 120 is a copper anode 102, and the outer electrode 122 is a titanium cathode 106, though any suitable metal can be utilized for electrodes 102, 106. And, a high temperature alumina ceramic insulator 104 is provided between the outer electrode 122 and the inner electrode 120, though any suitable insulator can be utilized.

The digital μCAT 100 is preferably designed to have a substantially cylindrical base that terminates at one end in a circular lip, such that the digital μCAT 100 is shaped similarly to an upside-down top-hat. The copper anode 102 comprises a housing that forms the exterior of the digital μCAT 100. The anode 102 has a tubular shape with a cylindrical base at a bottom end of the thruster 100. The anode 102 extends to an annular outward extending exterior lip 108 and an inward extending inner lip 110 at an opposite top end of the thruster 100. The exterior and inner lips 108, 110 protrudes substantially perpendicular to the cylindrical base. The exterior lip 108 can be used for the thruster shell and to hold the thruster head, both are which are exemplarily shown in FIG. 2, as well as serving as the electrical connection to the rest of that apparatus, i.e., the cathode and anode. In certain embodiments, the copper anode's 102 surface is tapered, as this external taper is able to provide the most stable arc operation based on resistance measurements.

The copper anode 102 has the general shape of a tube that has an annular wall and a substantially cylindrical central cavity. The inner lip 110 extends slightly inwardly into the cavity to form a stop that retains the insulator 104 and cathode 106 within the annular wall of the anode 102. The ceramic insulator 104 is situated within the cylindrical cavity of the anode 102. The ceramic insulator 104 has a cup shape with a circular flat bottom and an upright annular wall at the outer periphery of the bottom. The titanium cathode 106 is shaped complementarily to the insulator 104 and has a flat base with a central upright member that extends upright from the flat base toward the top end of the thruster 100. The central member can have any suitable shape, but is shown to be cylindrical.

A conductive carbon paint or film 112 is disposed on the top of the upright wall of the anode about the central electrode 120. The upright member of the cathode 106 extends to the central opening of the anode 102, so that the proximal top end face of the cathode is substantially flush with the top end face of the anode 102, with a gap or space (as best shown in FIG. 1(a)) between the central upright member of the cathode 106 and the top surface of the anode 102. Thus, the top end face of the cathode 106 forms the top end face of the inner central electrode 120 and the top surface of the anode 102 forms the top surface of the outer electrode 122, with a space therebetween. As best shown in FIG. 1(b), the top surface of the central electrode 120 is not completely flush with the top surface of the outer electrode 122. Rather, the top surface of the central electrode 120 extends slightly beyond the top surface of the outer electrode 122.

The carbon paint 112 allows discharge ignition without special trigger. It forms a thin film having a resistance of >kOhm that allows passage of an initial current leading to partial film evaporation. Film evaporation as a result of preliminary current flowing between cathode and anode provides the initial particles into vacuum which cause the breakdown, and the formation of the cathode spot, expelling the cathodic jet. During the discharge cathode is the main electrode that supplied material into vacuum providing conducting media. The film is conductive but does not short circuit the anode and cathode electrodes. Rather, the charge goes between the anode and cathode, over the high-resistive film.

Figure 10A:
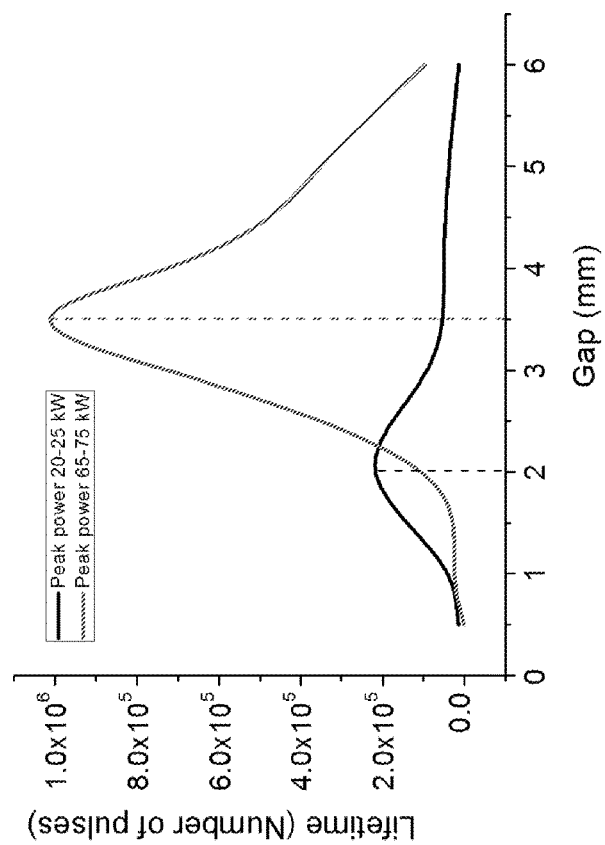
FIG. 10(a) is a chart showing the thruster lifetime vs. cathode-anode gap.
Figure 10B:
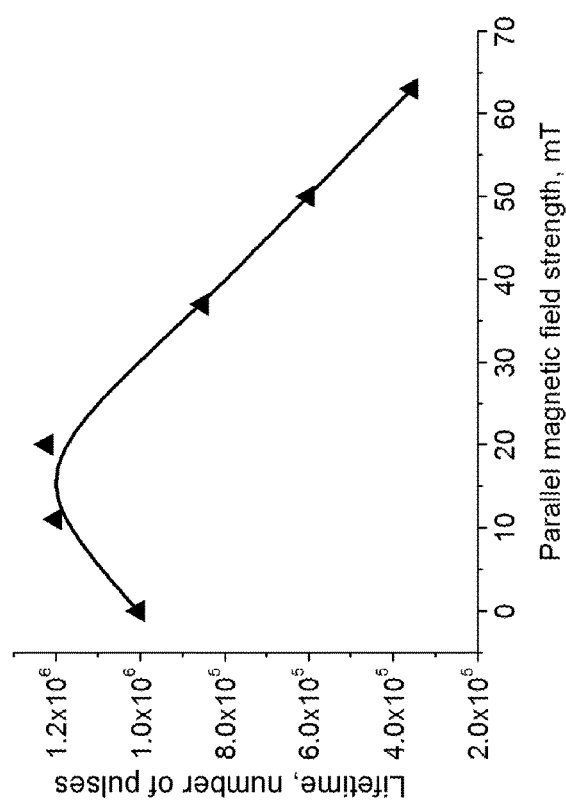
FIG. 10(b) is a chart showing the thruster lifetime vs. parallel magnetic field.

In one embodiment of the invention, each thruster has optimized triggering system. The ignition is the weakest part of the thruster. Optimization can be done for the case when no moving parts. One advantage of the modular thruster of the present invention is that each unit will have optimize performance, while life time if the thruster can be increased by increasing number of units. The paint 112 improves the number of pulses that can be provided by the thruster for an increased thruster lifetime. The cathode-anode gap and carbon paint film provide a maximum possible number of stable triggering events, such as an optimized number of pulses, such as for example over $10^6$ pulses. It depends on power and magnetic field as well. Referring to FIG. 10(a), a chart is provided showing the thruster lifetime vs. cathode-anode gap, for the low and high peak power levels. No magnetic field. In FIG. 10(b), the thruster lifetime vs. parallel magnetic field in the gap is shown, for the fixed high peak power (65-70 kW) and optimal inter-electrode gap (around 3.5 mm).

As anode-cathode resistance decreases, the initial resistance (typically 300-600 Ohm) abruptly decreases in several times just after several thousand pulses. The most probably reason is the deposition of a significant amount of metal particles from cathode, so the initially carbon-containing coating, as it was mentioned before [14], is quickly covered by a metal layer. However, the further behavior of anode-cathode resistance generally depends on the value of the anode-cathode gap. For a short gap, this resistance tends to decrease to a few Ohms, which leads to failure due to short circuit. Possible reason could be the excessively large flux of metal from cathode leading to over-replenishing the film and shortening the gap, since the energy delivered to anode-cathode interface is not enough to evaporate the thick layer of deposited metal. The metal flux decreases with the distance, so for the wider gaps (2-4 mm), thruster can survive for up to 1 million pulses, with fluctuating value of film resistance. However, for the relatively long gaps, the thruster tends to fail due to open circuit because of dramatic increase of anode-cathode resistance up to 100-300 kOhm, which probably occurs due to unsuccessful replenishing of the conductive film. The general dependence of thruster lifetime on the value of the gap is given in FIG. 10(a). It is clearly seen that by varying the gap one can obtain the maximal lifetime for the given peak power from power supply.

Note that lifetime is short at a low peak power regime, and it is growing several times at the high peak power. Also note that the optimal gap which corresponds to the maximal lifetime, shifts towards the higher gaps with the increasing peak power (i.e. for peak power within 20-25 kW optimal gap is 2 mm, but for peak power within 65-75 kW, optimal gap is nearly equal to 3.5 mm). Note, that in the high power regime, the average power was within 1-1.6 W, with energy in pulse in the range of 45-80 mJ, at 20 Hz repetition rate. In low power regime, such values were 0.2-0.6 W, and 10-35 mJ, respectively. For the high power regime and fixed optimal inter-electrode gap value (around 3.5 mm), we also considered the effect of parallel magnetic field on thruster lifetime. Results are given in FIG. 10(b).

FIG. 10(b) demonstrates that by increasing the magnetic field strength from zero to some optimal value (around 20 mT), it is possible to achieve the maximal lifetime up to 1.3 million pulses. However, further increase of magnetic field leads to decrease of lifetime even below its value for the zero magnetic field case. Such effect of parallel magnetic field on thruster lifetime could be explained by the change of film re-deposition regime caused by magnetic field. This clue is based on the following facts. It was visually observed that the presence of parallel magnetic field in the gap changes the shape and visually observing behavior of the cathode spot during discharge time.

With no magnetic field (FIG. 11(a), the cathode spot is localized along the "cathode-carbon paint-vacuum" interface. With some magnetic field, when the poles of magnet are directed with respect to electrodes in the way that the electromagnetic force (−J×B) pushes plasma up, the cathode spot tends to broaden across the front cathode edge. At optimal magnetic field (FIG. 11(b)), the cathode spot is almost fully localized on the front end of cathode during discharge time, so the film damage caused by arcing is reduced, with the cathode material particles flux directed toward the anode-cathode interface. Therefore, such position of the spot seems to be the most optimal in terms of the film replenishing by the cathode material. Note that in the opposite case (when the poles of magnet are reversed), the cathode spot due to electromagnetic force tends to penetrate into the ceramic plate through the film, and thruster lifetime becomes extremely low (several tens thousands of pulses), with unstable discharge and low current amplitude (5-20 A even for the 'high peak power' setup). With relatively higher magnetic fields, the cathode spot travels to the upper face of the cathode (FIG. 11(c)), which decreases the flux of cathode material replenishing the film and thereby reduces the lifetime.

FIG. 12 shows the thruster arc current (FIG. 12(a)) and anode-cathode resistance versus the number of arcing pulses (FIG. 12(b)), for a thruster with optimized parameters: high power regime, gap 3.5 mm, parallel magnetic field value 20 mT. With optimized thruster parameters, such as high peak power regime, with optimal values of inter-electrode gap and parallel magnetic field value, the arc current is nearly constant during almost all lifetime, and it goes down dramatically only in several tens of thousands pulses before the final failure.

Thus, the gap between anode and cathode in the case of a triggerless micro-cathode vacuum arc thruster is a very important factor which directly effects the thruster lifetime. Another important factor is a peak power, which determines the intensity of ablation of cathode material and thus the intensity of the replenishing the degrading inter-electrode film. The presence of parallel magnetic field also changes the regime of erosion and replenishing of the inter-electrode film. Therefore, in triggerless micro-cathode vacuum thruster, the optimization of electrical power, inter-electrode gap and parallel magnetic field value allows one to obtain up to 1.3 million arcing pulses (around 15 day of continuous work at pulse repetition rate of about 1 Hz). However, real space missions for CubeSats with such type of thrusters may require significantly longer lifetime (say, several months). Based on presented results one can conclude that special attention should be given to the insulator selection and cathodic jet interaction with the insulator surface. Hence, after optimizing the inter-electrode gap, electrical power and the value of magnetic field, such "idealized" thruster model can provide up to 1.2-1.3 million pulses with the high degree of stability of ignition and amplitude of arc current. These findings may be used in designing of micro-cathode thrusters with the rigidly fixed, unmovable electrodes.

The film 112 rests against the inward lip 110 and has a diameter that is larger than the diameter formed by the inward lip 110 but smaller than the diameter formed by the anode wall. The cathode 106 and insulator 104 can be friction or press fit with the anode 102, or can be adhered by a high temperature adhesive, and thus cannot come free from the anode housing 102. A similar lip or cover can be provided at the base end of the thruster 100 to prevent the insulator, film 112 and cathode 106 from exiting the cavity of the anode 102 at the base end. It is further noted that the ceramic insulator 104 and film 112 cooperate to prevent direct contact of the anode 102 and the cathode 106. In effect, the film 112 forms a cover within which the base of the cathode 106 is received, and the central upright member of the cathode 106 extends upward and out beyond the film 112. In such a configuration, the titanium cathode 106 appears in cross-section as an inverted T-shape, with a smaller cylindrical portion exposed at the top surface of the digital μCAT 100. In certain other configurations, the lips 108, 110 of the copper anode 102 may form a T-shape and extend both outwardly and inwardly from the radial center of the digital μCAT 100. However, the inner lip 110 of the copper anode 102 does not extend inwards to a degree that it contacts the titanium cathode 106.

Figure 2A:
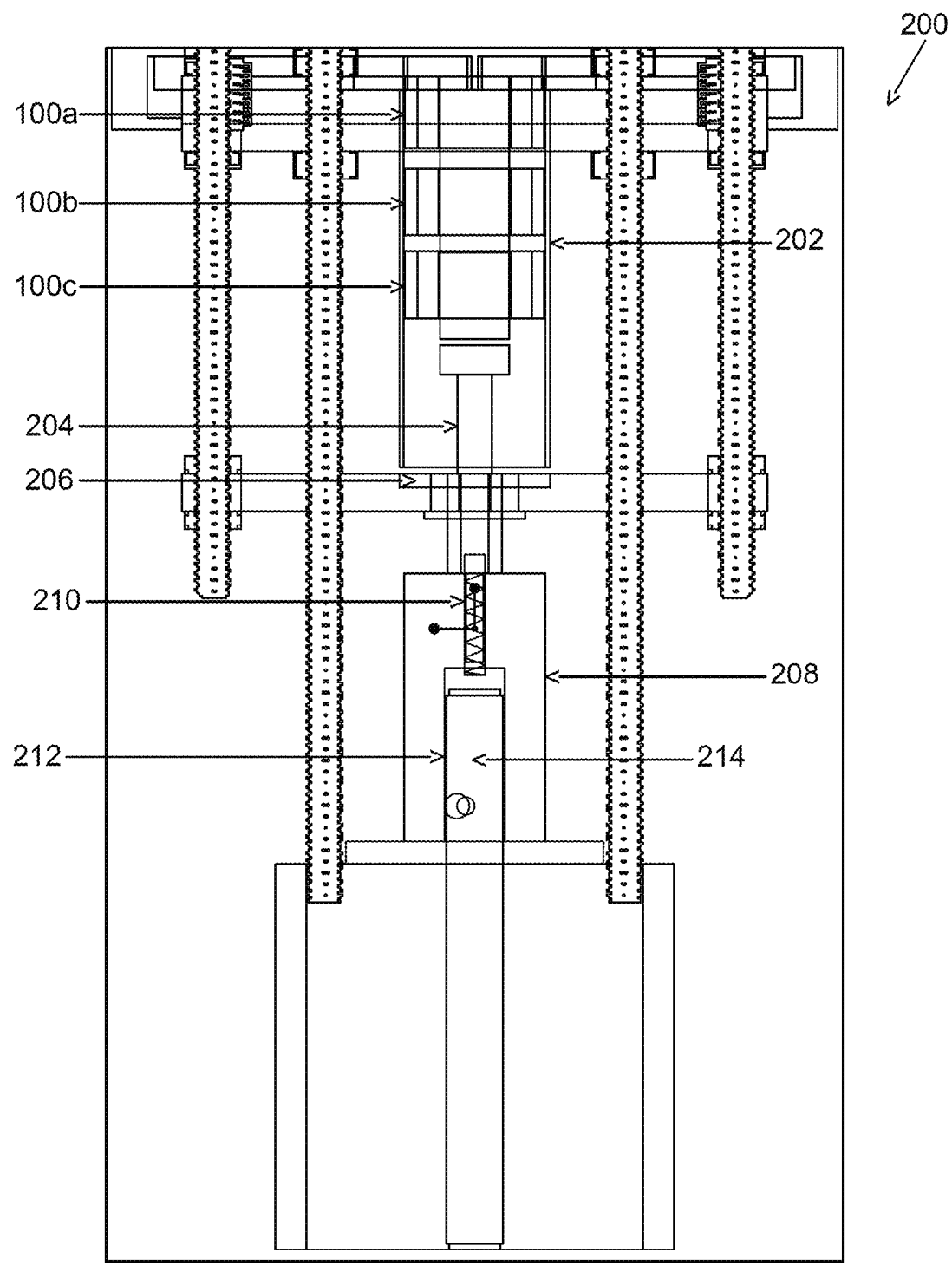
FIG. 2(a) shows a plurality of modular micro-cathode arc thrusters according to an embodiment of the invention, where the thrusters are situated in an exemplary satellite in accordance with an embodiment of the invention.

As explained above, the cathode 106 is situated in the center of the arc thruster. Because of this, complications may arise for refueling. However, the digital μCAT 100 removes that issue by having a static fuel amount in the arc thrusters, due to the depletion of the cathode as the exhaust plume is produced. FIG. 2(a) shows an exemplary embodiment of the invention, in which a plurality of digital arc thrusters 100a, 100b, 100c (here, three digital μCATs, though any suitable number and thruster can be utilized) are situated within a satellite 200. The satellite 200 is shown with its thrusters 100a, 100b, 100c oriented towards the rear of the satellite 200 (the top of the page), such that the thrusters 100a, 100b, 100c eject their plasma plume exhaust in that direction, propelling the satellite 200 in the opposite direction, i.e. forward.

The thrusters 100a, 100b, 100c are stacked on top of each other, such that only one thruster is used by the satellite 200 at a time. In the exemplary configuration shown, the first thruster 100a is activated to move the satellite 200. Once the first thruster 100a is "empty", in the sense that its cathode is ablated through use, the first thruster 100a will be ejected, and a new thruster, the second thruster 100b, will take its place. Once the second thruster 100b is empty, it is ejected, and the third thruster 100c will engage. Because each digital μCAT 100 has a known amount of propellant, it is known how long each thruster 100 will last. The thrusters 100a, 100b, 100c are modular so that they are identical to each other so there is no variability between the thrusters 100. This engineered consistency and reliability is an important aspect of the present invention.

Referring to FIGS. 1 and 2, the thrusters can be stacked by placing the base end of the first thruster 100a on the top surface of the second thruster 100b, and the base end of the second thruster 100b on the top surface of the third thruster 100c, so that each thruster directly contacts its neighboring thruster and all the arc thrusters are indirectly coupled with each other. In one embodiment, the thrusters are directly aligned with each other in a row or column, with one thruster immediately behind or below the next. It is further noted that by altering the size of the casing, any amount of digital μCATs 100 may be used in the thruster 200. Moreover, if anything negative happens and a thruster 100a, 100b, 100c malfunctions, then it can be ejected (together with any thrusters that come before it) and replaced with a new one. And in one embodiment the thrusters can be indirectly coupled to each other such as by a separator plate or the like.

Figure 8:
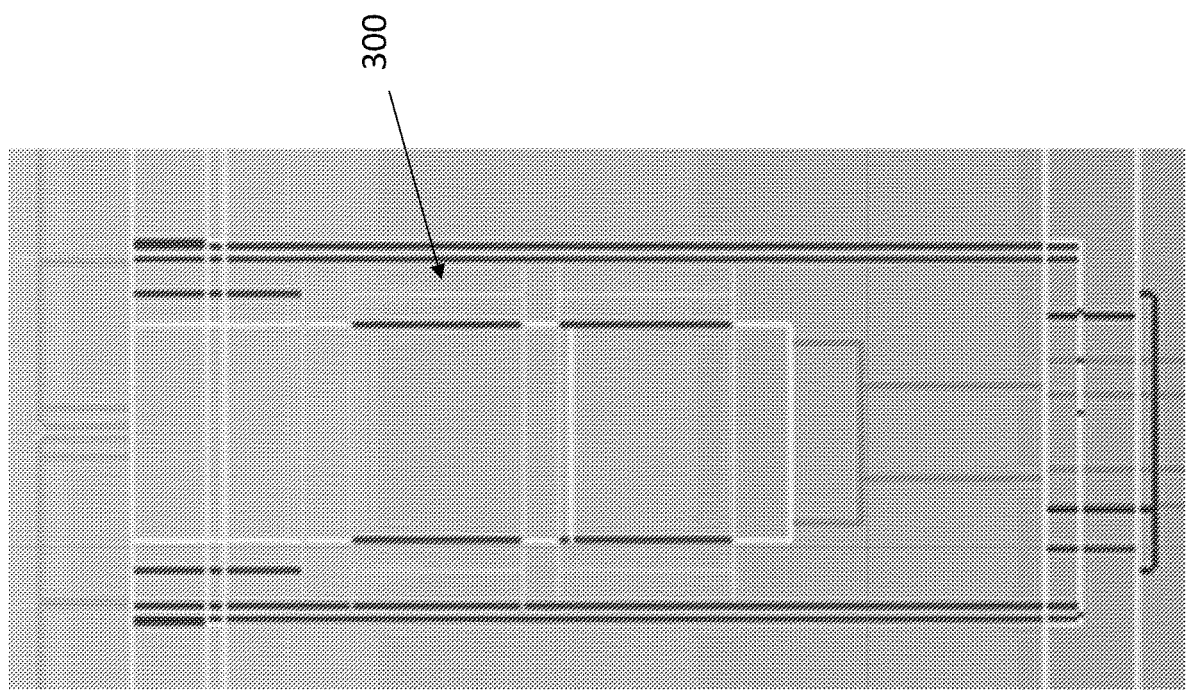
FIGS. 8 and 9 show an alternative embodiment of the invention.
Figure 9:
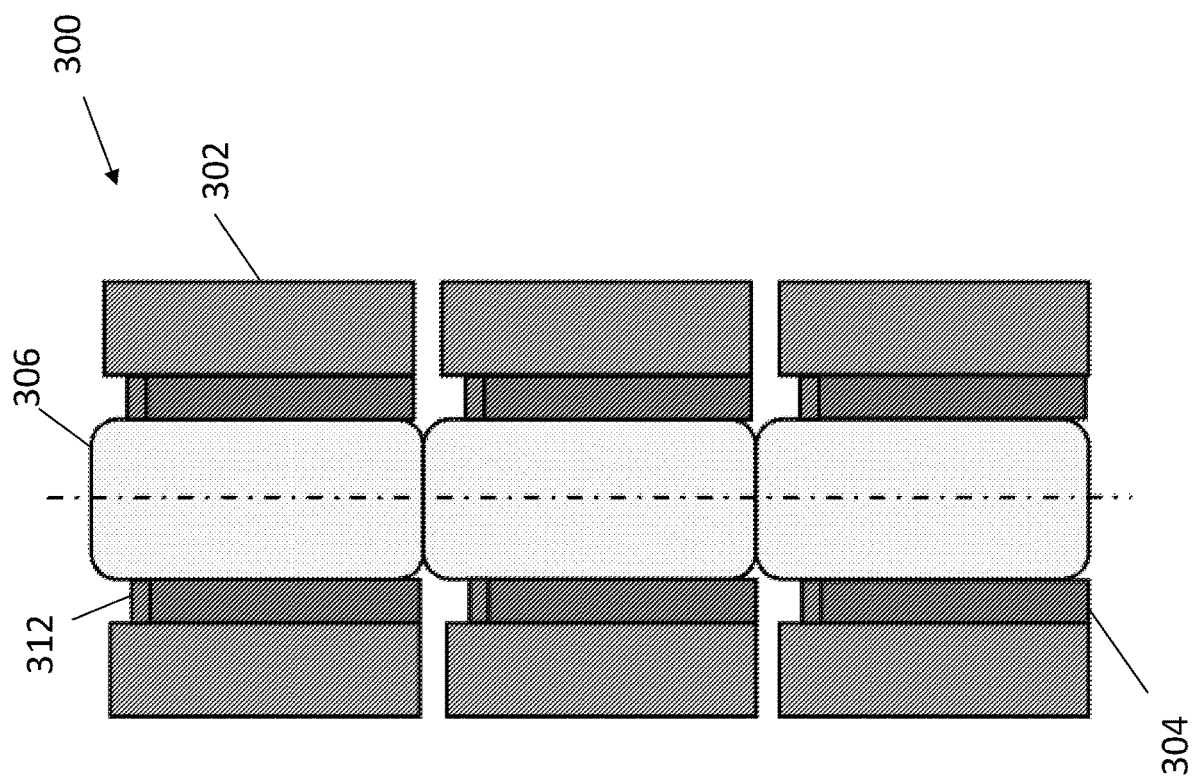

Turning to FIGS. 8 and 9, another example non-limiting embodiment of the invention is shown. Here, the microcathode arc thruster 300 has an outer electrode 302, inner electrode 306 and insulator 304 therebetween. Each of the electrodes 302, 306 and the insulator are cylindrical. The outer electrode 302 can be an anode and the inner electrode 306 can be a cathode. The bottom of the thruster 300 can be relatively flat, such that the bottom end surface of the anode 302 is substantially flush with the bottom end surface of the cathode 306 and the bottom end surface of the insulator 304. The anode 302, insulator 304, and cathode 306 can be friction or press fit together, or can be adhered such as by a high-temperature adhesive.

The insulator 304 has a height that is slightly smaller than the height of the anode 302, and the cathode 306 has a height that is slightly larger than the height of the anode 302. Thus, the cathode 306 is longer than the anode 302, so that the top end surface of the cathode 306 extends outward from the top end surface of the anode 302. And the anode 302 is longer than the insulator 304, so that the top end surface of the insulator 304 is recessed with respect to the top end surface of the anode 302 and the cathode 306. As shown, the thrusters 300 are stacked one on top of each other. Accordingly, the cathode 306 from one thruster 300 contacts the cathode 306 of the neighboring cathodes 306 at the top and bottom ends. That is, the top end surface of the bottom cathode 306 is in direct contact with the bottom end surface of the middle cathode 306, and the top end surface of the middle cathode 306 is in direct contact with the bottom end surface of the top cathode 306.

The top and bottom end surfaces are substantially flat to ensure a reliable contact between the adjacent cathodes 306. Thus, the outer anode electrodes 302 of the various thrusters 300 are prevented from coming into contact with one another, which might otherwise short-circuit the system. In addition, the central electrodes 306 are in contact with each other and are pushed forward by the motor 216 via the push rod 204. A voltage can be passed from the rod 204 (or another element) into the inner electrode 306, so that the voltage passes through each cathode 306 from the bottom thruster 300 to the top thruster 300. For the thrusters 100 of FIG. 1, the voltage can be applied to the cathodes 106, and the anodes 102 can be prevented from contacting each other, in any suitable manner.

As further illustrated in FIGS. 2, 8, the thrusters 100, 300 are situated in a first housing or a thruster housing 202 that has the same shape as the thrusters, here a cylindrical shape with a central cylindrical opening that is slightly larger than the outer diameter of the thrusters 100. The housing 202 has a top open end and a bottom open end. The top open end leads to an exterior of the satellite. The cathode and anode of the thrusters 100, 300 remain stationary as the satellite 200 operates. An ejector such as a push rod 204 is provided that in one embodiment is cylindrical and terminates in a widened flattened head. The push rod 204 extends into the housing 202 through the bottom open end, and is used to push against the most interior (bottom) thruster 100, 300 in the housing 202 (e.g., the bottommost thruster 100c in the embodiment of FIG. 2) in order to eject the outermost thruster 100, 300 (e.g., the topmost thruster 100a in the embodiment of FIG. 2) when that first thruster 100, 300 is depleted.

Figure 2B:
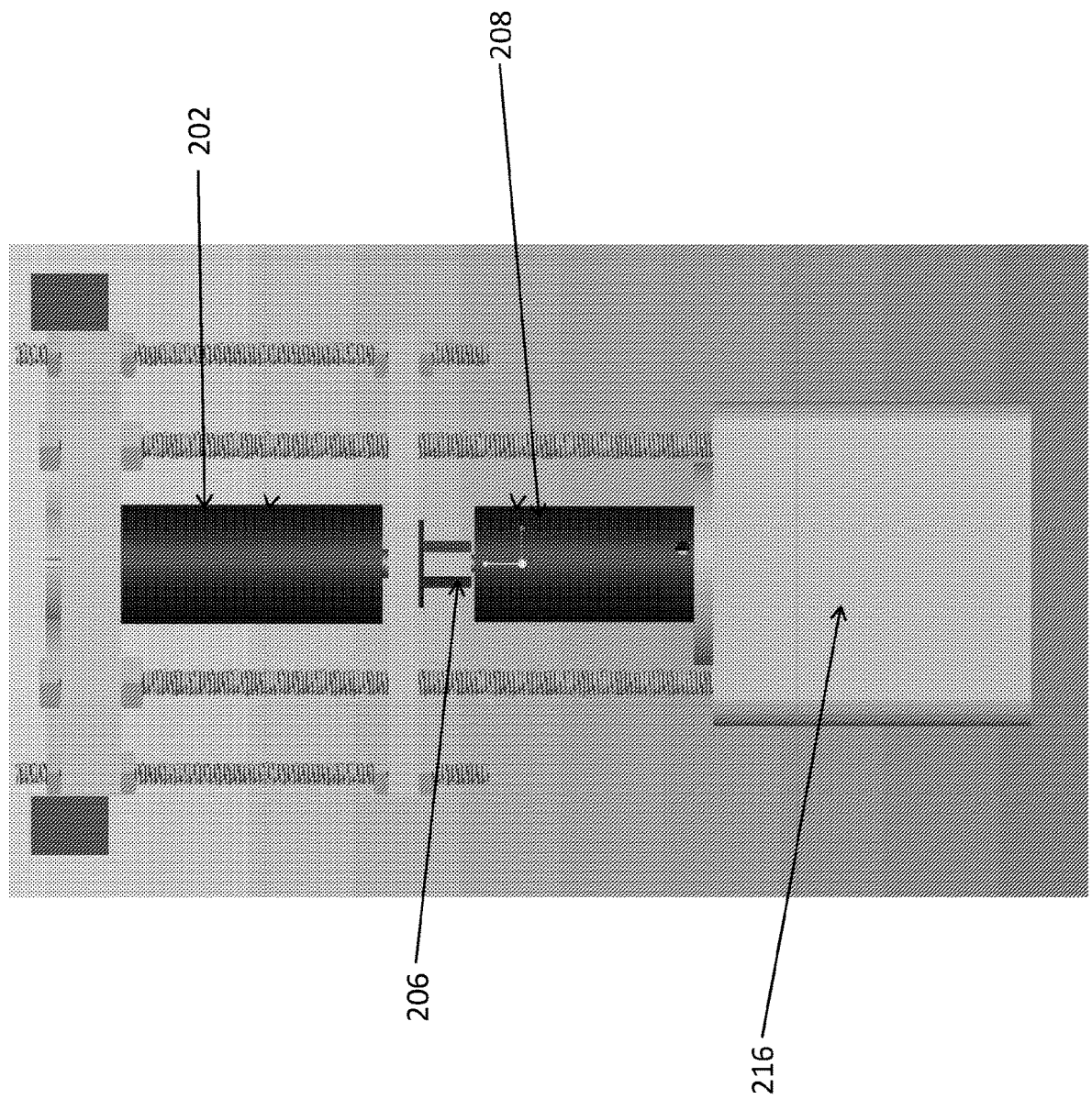
FIG. 2(b) shows a zoomed-in view of the first Polytetrafluoroethylene (PTFE) coupler, the second PTFE coupler, and the stepper motor that is used to power the motor shaft of the satellite in accordance with an embodiment of the invention.

The push rod 204 extends from the thruster housing 202, where it forms a guide member 206. The guide 206 is preferably hexagonal in shape and is an integral part of the push rod 204 as it extends from the thruster housing 202 to a second housing or a base housing 208. The push rod 204 extends into the second housing 208 and into a first PTFE coupler 210. A proximal end of the push rod 204 is threaded through the first PTFE coupler 210 and extends into a second PTFE coupler 212. The second PTFE coupler 212 is mechanically and fixedly attached to a motor shaft 214, such as a set-screw. The motor shaft 214 is preferably powered by a stepper motor, which controls linear motion. The first and second couplers 210, 212 convert the rotational motion of the motor shaft 214 to a linear motion. FIG. 2(b) shows a detailed view of the first PTFE coupler 210, the second PTFE coupler 212, and the stepper motor 216 that is used to power the motor shaft 214 shown in FIG. 2(a).

Figure 3A:
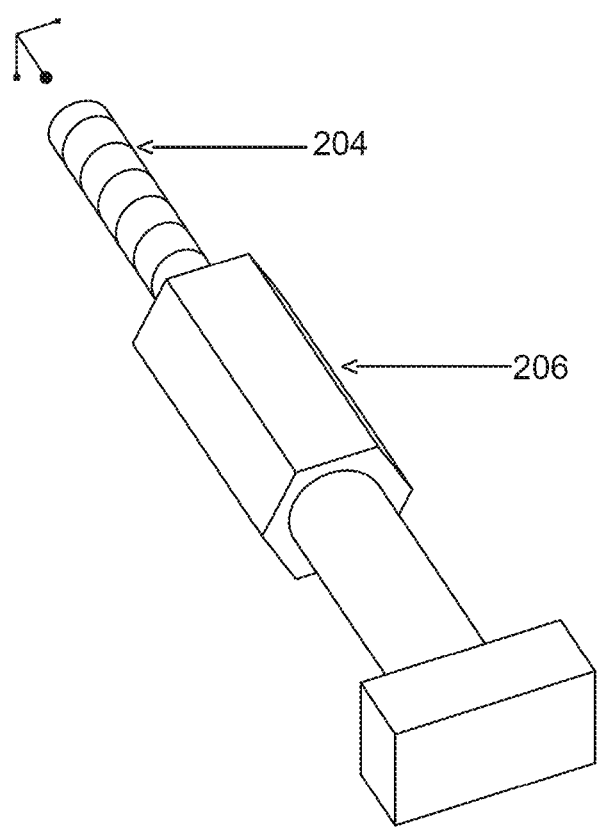
FIGS. 3(a)-3(c) show a zoomed-in view of the push rod and the sleeve, separate as well as assembled with a hexagonal ring in accordance with an embodiment of the invention.
Figure 3B:
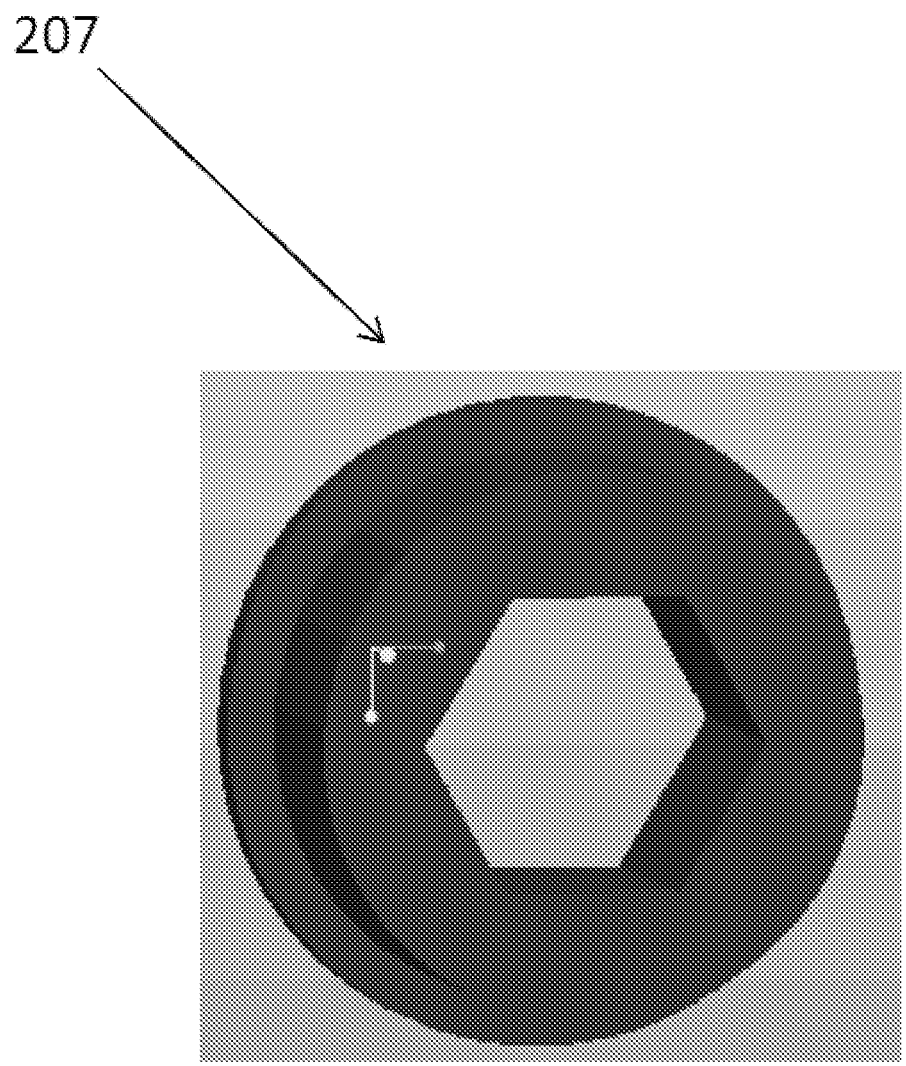
Figure 3C:
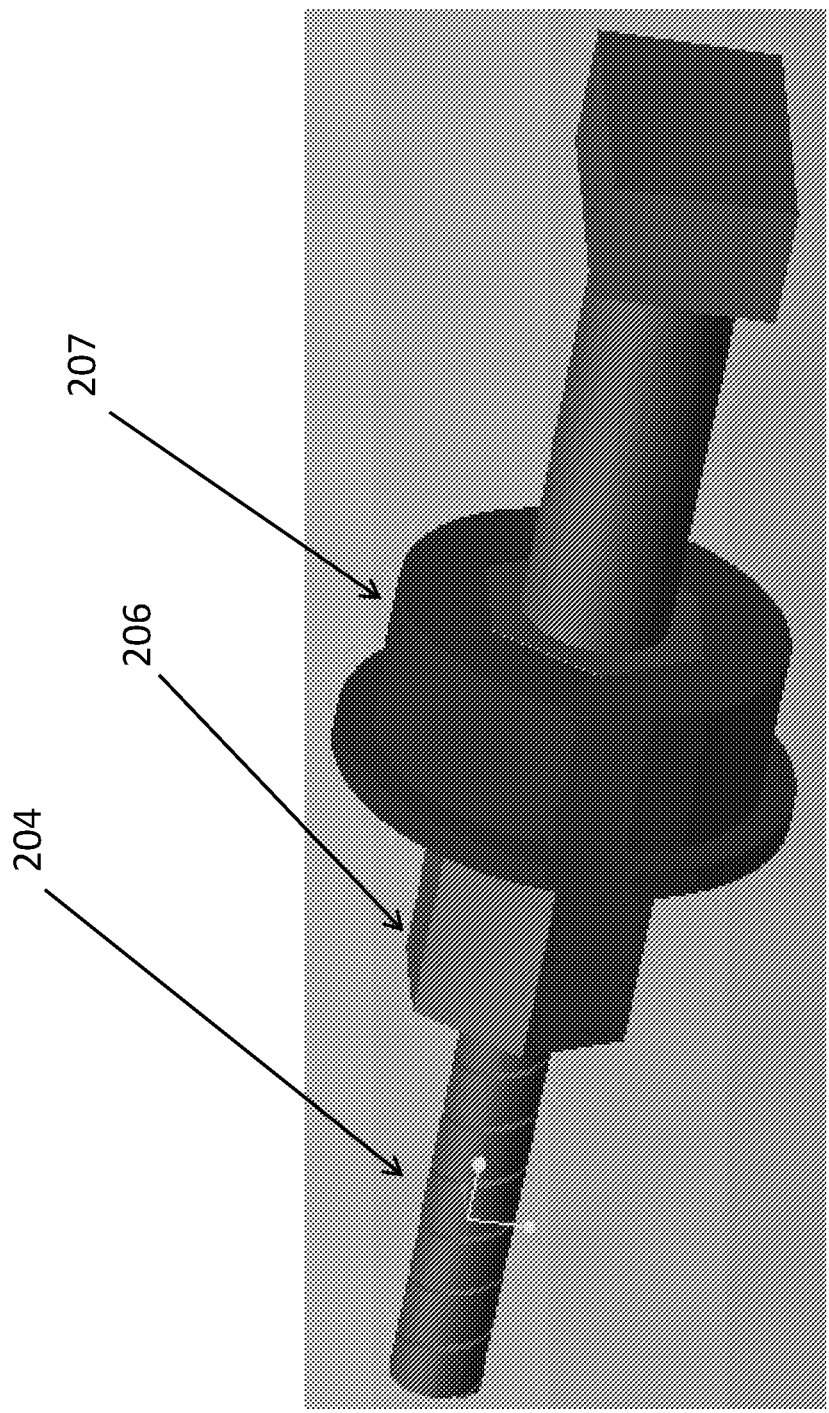

FIG. 3(a) shows a detailed view of the push rod 204, FIG. 3(b) shows a detailed view of the hexagonal guide or guide ring 207, and FIG. 3(c) shows a detailed view of the push rod 204 assembled with the ring 207. With respect to FIG. 3(a), the metallic push rod 204 is a single integral piece with three sections, namely a threaded section formed at a proximal end, a cylindrical section or neck with the widened head formed at a distal end, and an intermediate portion formed between the proximal end and the distal end. The threaded section is threadably engaged with the first PTFE coupler 210 (FIG. 2(a)). The intermediate portion comprises a guide member 206 that has a linear section, such as a hexagonal section. The hexagonal section 206 goes through a central hexagonal opening in the Delrin ring 207. The ring 207 is fixedly attached to the chassis or housing of the satellite so that the ring 207 and push rod 204 cooperate to translate the rotational motion created by the motor, to a linear that drives the push rod 204 forward. The cylinder has a square head that pushes linearly forward. The square end of the push rod 204 goes into the first housing 202, which is preferably fabricated from PTFE.

Thus, in operation (referring to FIGS. 2(a), 2(b), 3(a), 3(b), 3(c)), as the motor shaft 214 rotates, the second coupler 212 rotates the first coupler 210 with respect to the push rod 204. Meanwhile, the hexagonal ring 207 (which remains stationary because it is fixed to the satellite chassis) prevents the push rod 204 from rotating, so that the push rod 204 moves linearly forward (toward the rear of the satellite 200). That in turn ejects the expended thruster 100, 300.

The first housing 202 is seated in either end of the chassis and houses the sets of electrodes, or thrusters 100, 300. There are several (in this case three) sets in the housing 202 to form coaxial electrodes separated by a dielectric insulator.

Figure 4:
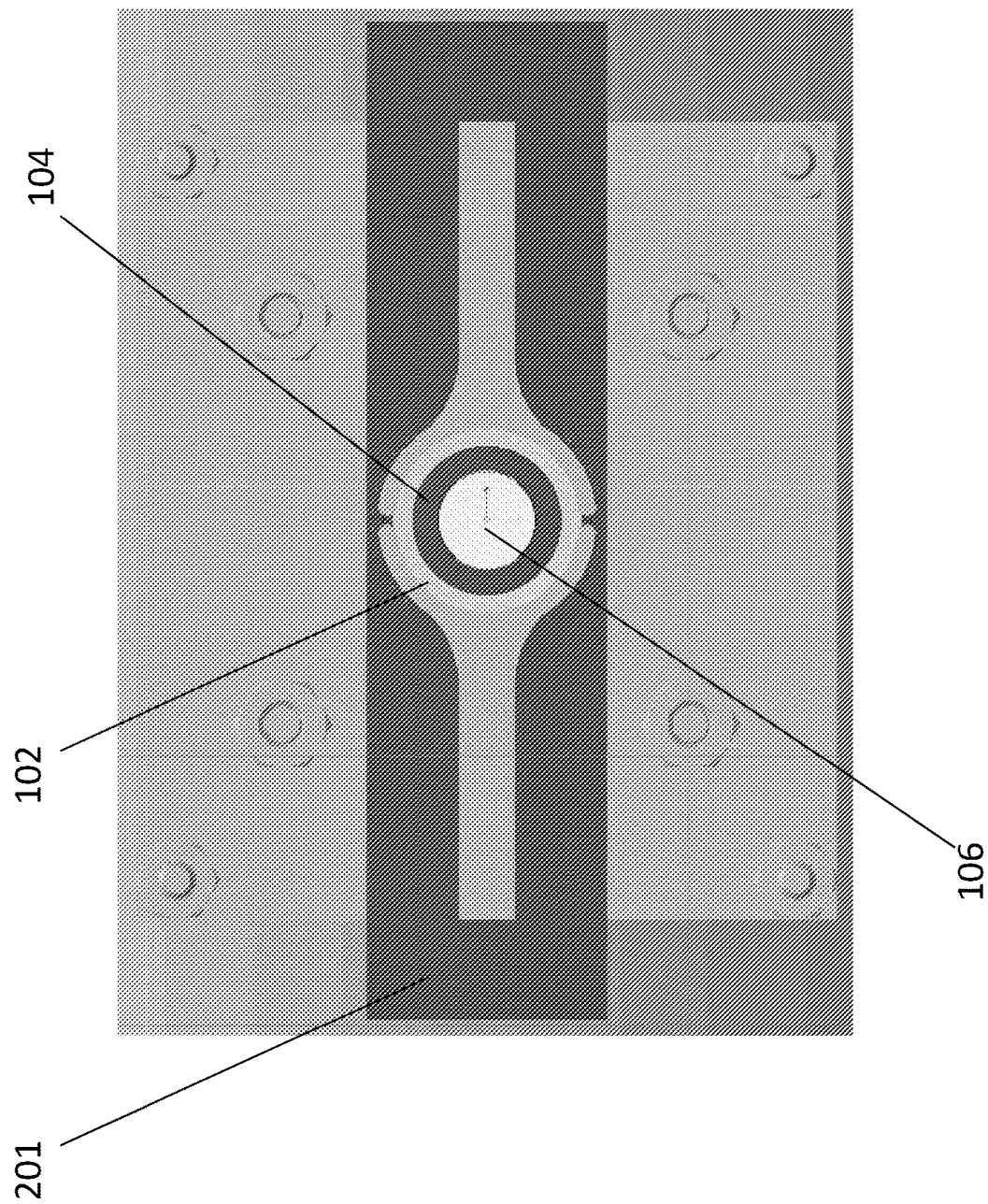
FIG. 4 shows a top view of the door through which the thrusters are ejected once depleted in accordance with an embodiment of the invention.

FIG. 4 shows a rear view (the top of FIG. 2(a)) of the satellite 200. The satellite 200 have one or a pair of doors 201 through which the thrusters 100, 300 are ejected once depleted. The doors are spring-loaded and open outwards in response to the push rod 204 pushing the thruster forward. The spring is biased to keep the door 201 closed, so that the door 201 shuts once the thruster is fully ejected. The copper anode 102, 302 a high temperature alumina ceramic insulator 104, 304 and a titanium cathode 106, 306 to the outermost thruster are shown in the figure. The door 201 has an opening through which the thruster 100, 300 can emit its discharge to propel the satellite 200. The door opening is smaller in diameter than the thruster 100, 300 so that the thruster 100, 300 does not inadvertently fall out of the satellite 200.

The spring loaded doors on the front of the chassis, seated in a dielectric housing, have the opposing voltage going through them and are in contact with the outer electrode. The doors are spring loaded for when the thruster stops arcing. Should the thruster cease arcing, the motor 216 is turned on and pushes the sets of thrusters forward within the thruster housing 202. The front thruster 100a, 300 pushes the doors open until it is cast off. Once the thruster 100a, 300 has been discarded the doors spring back into place and retain the next thruster in line. When the new thruster 100b, 100c, 300 comes into contact with the doors the motor 216 stops pushing the thrusters forward and the new thruster begins to arc.

Figure 5C:
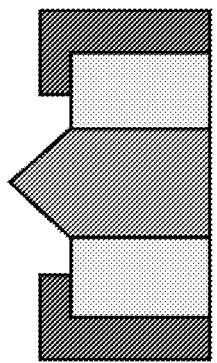
FIGS. 5(a)-5(c) show optimization of the cathode in a typical thruster where the cathode adopts various geometries.
Figure 5B:
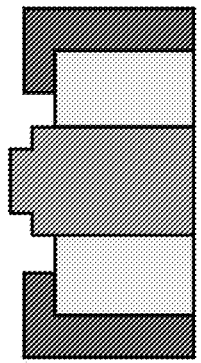
Figure 5A:
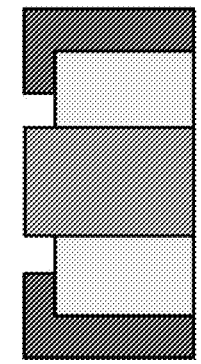
Figure 6C:
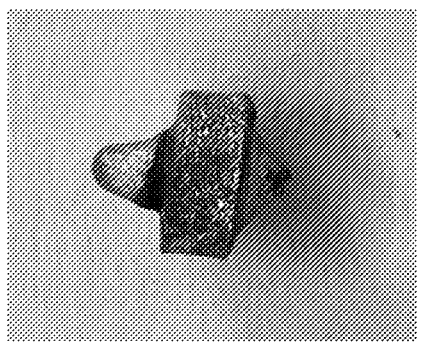
FIGS. 6(a)-6(f) show the results of simple quantitative tests to see the erosion pattern of various cathode designs, with and without a ceramic insulator.
Figure 6F:
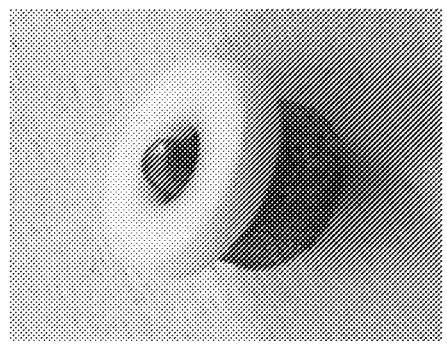
Figure 6B:
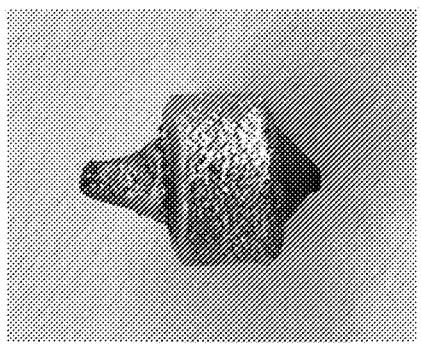
Figure 6E:
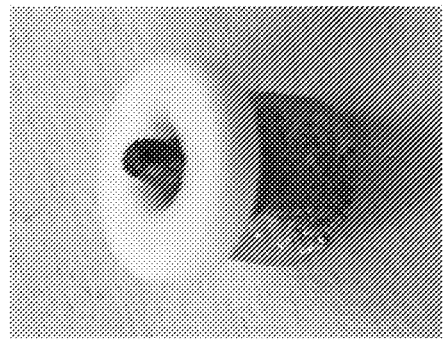
Figure 6A:
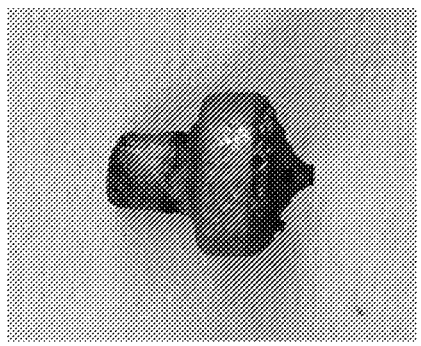
Figure 6D:
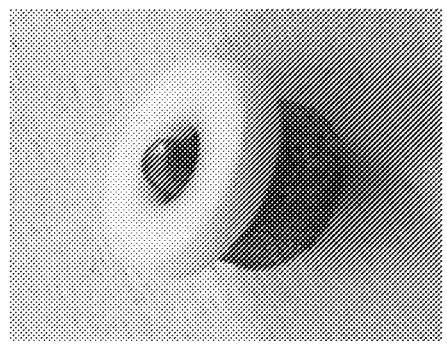

FIG. 5 shows alternative embodiments for the geometry of the cathode 106, 306 in the thruster 100, 300. FIG. 5(*a*) shows a simple cylinder, whereby the cathode extends straight upwards from the thruster 100, 300. This is the simplest design and possibly the most cost efficient. FIG. 5(*b*) shows another embodiment, where the cathode 106, 306 forms a stepped cylinder with a base cylinder and a central stepped portion extending outward (upward in the embodiment of FIG. 5(*b*)) from the top surface of the base cylinder. Additional stepped portions can also be provided. This design has been used in variety of hypersonic plasma studies, and the cathode spots naturally work their way to the surface. Once cathode erosion occurs at the tip, the cathode continues facing straight outwards, which will direct the exhaust plume in the proper direction. Uniform erosion may happen with this setup. FIG. 5(*c*) shows the cathode 106, 306 having a conical shape. Cathode spots naturally travel upwards towards the tip, which will erode from the top down. The downside of this design is that the plume will naturally shift direction, as the conical tip does not provide proper direction until eroded. And once eroded, there is no guarantee the erosion will happen in a parallel plane to the thruster head normal, leading to expulsion directly facing outwards. As such, the stepped cylinder design of the cathode is most preferable, followed by a conical shape.

FIGS. 6(*a*)-6(*f*) show the results of simple quantitative tests to see the erosion pattern of various cathode designs, with and without a ceramic insulator. The erosion profiles during testing are shown. Testing was run for thousands of pulses, and then stopped. No magnetic fields were used in these tests, as it was theorized with a central cathode, that a magnetic coil was not needed for proper erosion. These results showed differently however, depending on the presence of a ceramic insulator.

Figure 7:
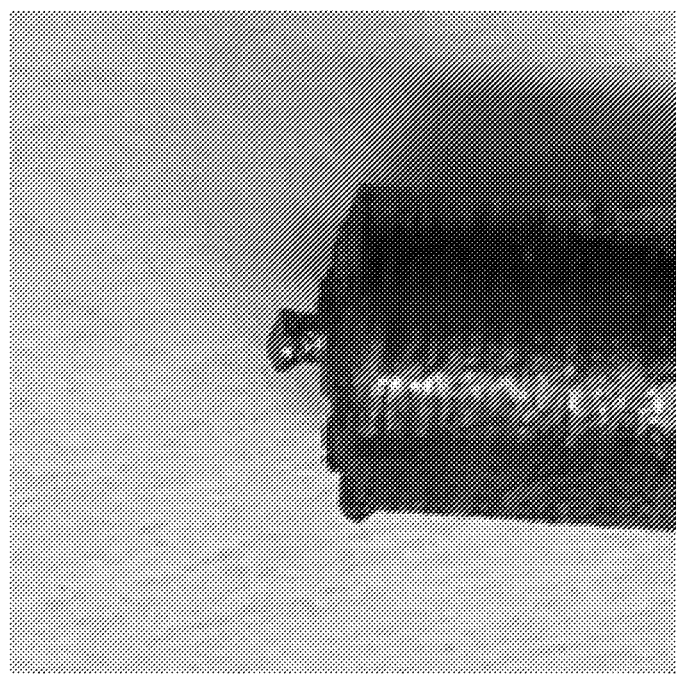
FIG. 7 shows an optimization study where a cylindrical cathode of an excessive length was used.

The cylindrical cathode eroded uniformly when the cathode length was short as seen in FIGS. 6(*a*) and 6(*d*). The surface however is slanted to one side, which signifies a non-uniform erosion. The length of this particular cathode was reasonable in length, and thus can work for the Digital μCAT. A much longer cylindrical cathode was used in the experimental setup in FIG. 7. The arc occurred along the inner interface, and a cavity began to form. Since the plume was coming out normal to the sideways surface, a coating formed along the anode surface, and a loss of the plasma plume can thus be assumed. From these results, it is clear that, if a cylinder is to be used, the length must be cut short, as a magnetic field may allow the cathode spots to traverse to the tip, assuming the cathode length is reasonable.

The stepped cathode formed a cavity along the interfaces, but primarily eroded the entire surface as shown in FIGS. 6(*b*) and 6(*e*). The benefit the stepped cylinder has over the normal cylindrical is that the normal erosions are now angled and facing outwards. One can also notice that the length of the cathode can be extended, and the cathode spots progress along the stepped surfaces towards the tip. Mostly uniform erosion was found, but one side was slightly more eroded more than the other. With a magnetic field, this erosion point would be further pushed towards the top surface, and may erode more from the top down, verses near the interfaces.

The conical cathode, similar to the cylindrical cathode, began to form a cavity at the cathode-insulator interface which can be seen in FIGS. 6(*c*) and 6(*f*). The tip was also eroded more smoothly than the stepped cathode however, which signifies that the cathode spots had an easier time traversing towards the tip. The erosion was generally uniform, except for one side of along the interfaces.

Similar to the cylindrical cathode, if the cone cathode is too long, the erosion could potentially eat through the base of the cathode. This could lead to a ball forming at the tip, which could then be blown off. Not only is this a huge loss in cathode material, but a potential disaster as a short circuit. A magnetic field should force uniform erosion across the entire surface.

Through the above experimentation and estimation, it was found that a short cylinder is the best design for the cathode. The cylindrical cathode appears to have uniform erosion along the surface, and retaining the cathode material along the interfaces. The cylinder also provides the most propellant. The negative however, is that the length is limited. A cylindrical cathode that is too long can lead to cavities, causing plasma to be expelled towards the anode, and not out the back. During operation, this will cause a loss of propellant. In one example embodiment, the central cathode 106, 306 is short if its height h (i.e. distance between the upper end of this electrode and the plane with conductive inter-electrode film) is less than the diameter of this central cathode d (h<d). And the central cathode 106, 306 is long if h>>d (say, h=5d).

The stepped cylindrical cathode reduces the potential for inward facing exhaust direction, but a gap begins to form along the electrode-insulator interface. A longer cathode can be built for this however, and the cathode spots will naturally travel up the cathode towards the tip. More irregularities are possible with this design in comparison to the conical shape. The conical geometry erodes the most uniform, across all surfaces. Similar to the stepped cylinder, a gap begins to form between the electrode-insulator interface. Without a magnetic field, the short length cylinder was shown to be the better performing geometry, and the most efficient in terms of propellant. Although some non-uniformity of the top surface occurred, that could be controlled with a magnetic coil.

Operating with a centralized cathode brings forward new challenges compared to the previous design. Keeping the components together becomes significantly more challenging. The simplified design of the present invention, however, provides a guaranteed result of how long each puck will last, with no unknown possibilities. This package is also easy to run full lifetime testing, making design iteration easier. Using the disclosed designs, each thruster or digital μCAT launcher, can be engineered for as many digital μCATs as desired. This allows missions for various lengths be designed for, and have a guarantee to get to their destination with no limitations. This concept can push the bounds of what the previous μCATs could not, and also provide a known guarantee.

It is noted that the description uses several geometric, relational, directional, or positional terms, such as hexagonal, cylindrical, round, top, bottom, rear, forward, circular, distal, proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

It is further noted that the invention can have any suitable size and shape. In one embodiment, the thrusters are approximately. It is further noted that while the invention is illustrated with respect to a micro arc thruster, it can be applied to any electrical thruster that utilize solid propellant and has needs to optimize triggering system for limited number of firing. Multiple units provides increase of lifetime.

In addition, a specific embodiment is described and shown for ejecting thrusters, including a housing 202, push rod 204, ring 207, couplers 210, 212, and motor 214. It will be apparent to one skilled in the art that any suitable mechanism can be utilized to eject the thrusters, for instance by using a spring or other actuator. Thus, the embodiments shown and described are not intended to limit the invention, but merely to illustrate one possible embodiment of the invention. Other suitable implementations can be utilized within the spirit and scope of the invention. In addition, more than one set of thrusters can be located each at a different position on the satellite housing/chassis, and the motor can separately control each ejector 207 associated with a respective set of thrusters or can collectively control all of the ejectors 207 to simultaneously eject a thruster from all of the sets of thrusters.

Still further, a controller or processing device (such as a semiconductor chip or the like) can be provided to control operation of the motor. The controller can determine when a thruster 100 needs to be ejected, such as if the thruster has been depleted or malfunctions or otherwise needs to be replaced. That determination can be made in any suitable manner. For example, the controller can control the value of arcing current for each arcing pulse. If there is a huge DC current (upper certain limit), that means the thruster experiences the short circuit between anode and cathode and it should be ejected. Also, if there is no arcing current during, for example, a certain amount of triggering pulses, this means that thruster has an open circuit between anode and cathode and also should be ejected away. The controller can also be used to control other operation of the satellite, such as direction and operating the thrusters.

The following references are incorporated by reference: (1) M. Keidar, T. Zuang, A. Shashurin, G. Teel, D. Chiu, J. Lucas, S. Hague, L. Brieda. Electric Propulsion for Small Satellites, Plasma Physics and Controlled Fusion, vol. 57 (2015) P. 014005, https://doi.org/10.1088/0741-3335/57/1/014005. (2) A. R. Tummala, A. Dutta. An Overview of Cube-Satellite Propulsion Technologies and Trends//Aerospace, 2017, Vol. 4, Iss. 4, P. 58, http://dx.doi.org/10.3390/aerospace4040058. (3) I. Levchenko, K. Bazaka, Y. Ding, Y. Raitses, S. Mazouffre, T. Henning, P. J. Klar, S. Shinohara, J. Schein, L. Garrigues, M. Kim, D. Lev, F. Taccogna, R. W. Boswell, C. Charles, H. Koizumi, Y. Shen, C. Scharlemann, M. Keidar, S. Xu. Space micropropulsion systems for Cubesats and small satellites: From proximate targets to furthermost frontiers//Applied Physics Reviews, Vol. 5 (2018), p. 011104, https://doi.org/10.1063/1.5007734. (4) A. O. David, A. Knoll, Experimental Demonstration of an Aluminum Fuelled Propulsion System for CubeSat Applications. Journal of Propulsion and Power, Vol. 33 (5), (2017), pp. 1320-1324, https://doi.org/10.2514/1.B36330.

(5) Ryan C, Wantock T, Harle T, Knoll A K. Performance Characterization of the Low-Power Halo Electric Propulsion System. American Institute of Aeronautics and Astronautics Journal of Propulsion and Power: devoted to aerospace propulsion and power, 32 (6), 2016, pp. 1544-1549, https://doi.org/10.2514/1.B36091. (6) Kolbeck, J, Lines, D and Knoll, A K (2015), Experimental Investigation of an Aluminium Fuelled Vacuum Arc Thruster In: 34th International Electric Propulsion Conference, 2015-07-04-2015-07-10, Kobe, Japan, http://epubs.surrey.ac.uk/809308/1/IEPC-2.pdf. (7) S. Hurley, G. Teel, J. Lukas, S. Hague, M. Keidar, C. Dinelli, J. Kang. Thruster Subsystem for the United States Naval Academy's (USNA) Ballistically Reinforced Communication Satellite (BRICSat-P), Transactions of JSASS, Aerospace Technology Japan, Vol. 14, No. ists30, 2016, pp. Pb157-Pb163, https://doi.org/10.2322/tastj 0.14.pb_157.

(8) See NASA webpage for additional mission details: https://www.nasa.gov/feature/goddard/2016/nasa-engineer-awaits-launch-of-cubesat-mission-demonstrating-virtual-telescope-tech. (9) A. Anders, I. G. Brown, R. A. MacGill, M. R. Dickinson. 'Triggerless' triggering of vacuum arcs//Journal of Physics D: Applied Physics, Vol. 31, Iss. 5, P. 584-587, 1998, https://doi.org/10.1088/0022-3727/31/5/015. (10) K. Aheieva, K. Toyoda, M. Cho. Vacuum Arc Thruster Development and Testing for Micro and Nano Satellites//Trans. JSASS Aerospace Tech. Japan, Vol. 14, No. ists30, pp. Pb_91-Pb_97, 2016, https://doi.org/10.2322/tastj.14.Pb_91. (11) I. Kronhaus, M. Laterza, Y. Maor. Inline screw feeding vacuum arc thruster//Review of Scientific Instruments, 2017, Vol. 88, Iss. 4, P. 043505, https://doi.org/10.1063/1.4979706. (12) T. S. Zhuang, A. Shashurin, S. Hague, M. Keidar, "Performance characterization of the micro-Cathode Arc Thruster and propulsion system for space applications", 46th AIAA/ASME/SAE/ASEE Joint Propulsion Conference & Exhibit, July 2010, https://doi.org/10.2514/6.2010-7018.

(13) J. Kolbeck, M. Keidar, A. Anders, Micropropulsion Based on Vacuum Arc Physics and Technology: A Review//52nd AIAA/SAE/ASEE Joint Propulsion Conference, 2016, https://doi.org/10.2514%2F6.2016-5040. (14) G. Teel, A. Shashurin, X. Fang, M. Keidar. Discharge ignition in the micro-cathode arc thruster//J. Appl. Phys. 121, 023303 (2017), https://doi.org/10.1063/1.4974004. (15) J. Lucas, G. Teel, J. Kolbeck, M. Keidar, High Thrust-to-Power Ratio Micro-Cathode Arc Thruster, AIP Advances, 2016, Vol. 6, P. 025311, https://doi.org/10.1063/1.4942111. (16) M. Keidar, G. Teel, S. Hurley, "Micro-Cathode Arc Thruster", U.S. Patent 20170370353A1, issued Dec. 28, 2017, http://www.freepatentsonline.com/y2017/0370353.html. (17) S. Hurley, M. Keidar. Linear Actuated Micro-Cathode Arc Thruster System//52nd AIAA/SAE/ASEE Joint Propulsion Conference, 2016, https://doi.org/10.2514/6.2016-5043.

(18) I. Levchenko, S. Xu, G. Teel, D. Mariotti, M. L. R. Walker & M. Keidar, Recent progress and perspectives of space electric propulsion systems based on smart nanomaterials, Nat. Commun. 9, 879, 2018, https://doi.org/10.1038/s41467-017-02269-7. (19) R. Boxman, D. Sanders, and P. Martins, Handbook of vacuum arc science & technology: fundamentals and applications, Noyes Publishing, 1996, https://www.sciencedirect.com/science/book/9780815513759. (20) T. Zhuang, A. Shashurin, T. Denz, M. Keidar, P. Vail, and A. Pancotti, "Performance characteristics of micro-cathode arc thruster"//J. Propul. Power, Vol. 30, Iss. 1, P. 29-34 (2014), https://doi.org/10.2514/1.b34567.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A modular arc thruster satellite comprising:
a plurality of arc thrusters, wherein each arc thruster of the plurality of arc thrusters has an outer electrode, an inner electrode, and an insulator therebetween;
a thruster housing having an open end leading to an exterior of the modular arc thruster satellite, the thruster housing receiving said plurality of arc thrusters;
a push rod; and
a motor for selectively operating the push rod to eject one of the plurality of arc thrusters from the modular arc thruster satellite via the open end of said thruster housing once that one of the plurality of arc thrusters has been expended.

2. The modular arc thruster satellite of claim 1, wherein each arc thruster of the plurality of arc thrusters has a triggering system lasting for over $10^6$ pulses.

3. The modular arc thruster satellite of claim 1, further comprising a spring-loaded door at the open end of the thruster housing.

4. The modular arc thruster satellite of claim 1, wherein the inner electrode is comprised of titanium.

5. The modular arc thruster satellite of claim 1, wherein the insulator is comprised of ceramic.

6. The modular arc thruster satellite of claim 1, wherein said plurality of arc thrusters are cylindrical and stacked with respect to one another within the thruster housing.

7. The modular arc thruster satellite of claim 1, wherein the outer electrode forms an inward lip that retains the inner electrode and the insulator.

8. The modular arc thruster satellite of claim 1, wherein each arc thruster of said plurality of arc thrusters is a discrete device.

9. The modular arc thruster satellite of claim 1, wherein each arc thruster of said plurality of arc thrusters is modular.

10. The modular arc thruster satellite of claim 1, wherein said plurality of arc thrusters are stacked with respect to each other within said thruster housing.

11. The modular arc thruster satellite of claim 1, wherein the motor is a stepper motor.

12. The modular arc thruster satellite of claim 1, wherein the inner electrode is cylindrical.

13. The modular arc thruster satellite of claim 1, wherein the insulator has a top surface, and further comprising a conductive paint deposited on the top surface of the insulator.

14. The modular arc thruster satellite of claim 13, wherein the conductive paint has a high resistivity.

15. The modular arc thruster satellite of claim 1, wherein a gap is located between the outer electrode and the inner electrode, the insulator located in the gap, and the length of the gap provides an optimized life of the plurality of arc thrusters.

16. A method for operating a satellite comprising:
providing a plurality of discrete arc thrusters in a stacked relationship with one another;
determining if a top arc thruster of the plurality of discrete arc thrusters, has been depleted; and,
ejecting the top arc thruster of the plurality of discrete arc thrusters if it is determined that the top arc thruster of the plurality of discrete arc thrusters has been depleted.

17. A modular arc thruster satellite comprising:
a plurality of discrete arc thrusters in a stacked relationship with one another to define a top arc thruster and a bottom arc thruster;
an ejector coupled to the bottom arc thruster;
a motor for selectively operating the ejector to eject the top arc thruster from the modular arc thruster satellite once that top arc thruster has been depleted;
a satellite housing, and wherein said ejector comprising a push rod having:
a threaded first end threadably rotationally coupled with said motor;
a second end opposite the first end, said second end having a head coupled to the bottom arc thruster;
an intermediate portion between the first end and the second end, said intermediate portion having a linear portion; and
a guide ring fixed to the satellite housing and having a central opening that receives the linear portion of said intermediate portion and prevents the push rod from rotating in response to the threaded first end being threadably coupled with said motor so that said push rod moves linearly with respect to said motor and said plurality of discrete arc thrusters.

18. A modular arc thruster satellite comprising:
a plurality of discrete arc thrusters in a stacked relationship with one another to define a top arc thruster and a bottom arc thruster;
an ejector coupled to the bottom arc thruster;
a motor for selectively operating the ejector to eject the top arc thruster from the modular arc thruster satellite once that top arc thruster has been depleted;
a thruster housing retaining said plurality of arc thrusters, and a spring-loaded door at an open end of the thruster housing.

19. The modular arc thruster satellite of claim 18, wherein each arc thruster of the plurality of discrete arc thrusters has an outer electrode, an inner electrode and an insulator therebetween.

20. The modular arc thruster satellite of claim 19, wherein the outer electrode forms an inward lip that retains the inner electrode and the insulator.

21. The modular arc thruster satellite of claim 19, wherein the insulator has a top surface, and further comprising a conductive paint deposited on the top surface of the insulator.

* * * * *